US006832352B1

(12) United States Patent
Dooley (10) Patent No.: US 6,832,352 B1
(45) Date of Patent: Dec. 14, 2004

(54) PRESERVING PAGINATION OF A DOCUMENT CONVERTED BETWEEN DIFFERENT PAGE SIZES

(75) Inventor: Marilyn R. Dooley, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/190,658

(22) Filed: Nov. 12, 1998

(51) Int. Cl.$^7$ .................. G06F 15/00; G06F 17/00; G06F 17/21
(52) U.S. Cl. ................. 715/525; 715/13; 715/17; 715/30
(58) Field of Search ................. 707/525, 517, 707/513, 530; 345/127; 715/525, 530, 513, 517

(56) References Cited

U.S. PATENT DOCUMENTS

| | | | |
|---|---|---|---|
| 4,311,399 A | | 1/1982 | Wegryn et al. .............. 400/76 |
| 4,498,147 A | * | 2/1985 | Agnew et al. .............. 707/530 |
| 4,498,150 A | | 2/1985 | Gaudet et al. ............. 358/1.18 |
| 4,951,233 A | | 8/1990 | Fujiwara et al. ........... 707/525 |
| 5,425,138 A | | 6/1995 | Kumakawa ................ 707/510 |
| 5,613,017 A | | 3/1997 | Rao et al. .................. 382/174 |
| 6,043,802 A | * | 3/2000 | Gormish ..................... 345/127 |
| 6,144,974 A | * | 11/2000 | Gartland ...................... 707/517 |
| 6,199,080 B1 | * | 3/2001 | Nielsen ...................... 707/513 |
| 6,298,358 B1 | * | 10/2001 | Gormish ..................... 707/517 |

OTHER PUBLICATIONS

Larmore, L.L., et al., Efficient optimal pagination of scrolls, Communications of the ACM, Aug. 1985, vol. 28, Issue 8, pp. 854–856.*
Gruman, Galen, PageMaker 6.5 goes for the jugular, Macworld; San Francisco, Nov. 1996, vol. 13, Issue 11, p. 38.*

* cited by examiner

Primary Examiner—Joseph Feild
Assistant Examiner—William L. Bashore
(74) Attorney, Agent, or Firm—Maginot, Moore & Bowman, LLP (57) ABSTRACT

A method of converting a document from a first page size to a second page size includes the step of determining a first line length from the document formatted for the first page size. Another step of the method includes determining a first page length from the document formatted for the first page size. The method also includes the steps of defining a second line length for the second page size that is equal to the first line length, and defining a second page length for the second page size that is equal to the first page length. Yet another step of the method includes formatting the document to utilize the second page size, the second line length, and the second page length.

20 Claims, 3 Drawing Sheets

PRESERVING PAGINATION OF A DOCUMENT CONVERTED BETWEEN DIFFERENT PAGE SIZES

BACKGROUND OF THE INVENTION

The present invention relates generally to document conversions, and, more particularly to preserving pagination of a document converted from a first page size to a second page size.

In today's global economy, businesses quite commonly have divisions in many different countries and continents. A result of the international scope, a business must deal with differences between countries in which it operates. One such difference is that standard paper sizes differ between countries and continents. Businesses are likely to adopt the paper size of the country in which the business is located because (i) local businesses and people expect business to be conducted with the regional paper size, and (ii) the regional paper size tends to be less expensive than other paper sizes due to economies of scale experienced by local paper manufactures.

International businesses often have electronic documents such as product manuals, training manuals, and employee handbooks which need to be printed in different business locales. For example, a US division of a business may create an electronic document of a training manual. The US division is likely to format the training manual for US Letter paper since US Letter paper is highly available in the United States. A European division of the same business may wish to have copies of the training manual. Accordingly, the European division would like to print copies of the electronic document. However, if the European division prints the training manual on A4 paper, then the printed training manual will have an uncentered appearances due to the dimensional differences between A4 paper and US Letter paper.

In order to obtained a more professional looking printed document, the European division basically has two options. One, the European division may print the training manual on US Letter paper which is more costly for the European division. Two, the European division may resize the electronic document so that the training manual prints centered on A4 paper. While the second approach is more ideal, the resized A4 printed training manual may include broken page references. In particular, due to the differences between A4 paper and US Letter paper, the A4 printed training manual is likely to have different page breaks (i.e. pagination) than the US Letter printed training manual. Since the training manual was created for US Letter paper, the page references contained in a table of contents or an index of the training manual reference content on US Letter pages. The same content, however, is likely to appear on a different page of the A4 printed training manual.

Accordingly, there is a need for preserving pagination of a document converted from a first page size (e.g. US Letter) to a second page size (e.g. A4).

SUMMARY OF THE INVENTION

In accordance with one embodiment of the present invention, there is provided a method of converting a document from a first page size to a second page size. One step of the method includes determining a first line length from the document formatted for the first page size. Another step of the method includes determining a first page length from the document formatted for the first page size. Yet another step of the method includes defining a second line length for the second page size that is equal to the first line length. The method also includes the step of defining a second page length for the second page size that is equal to the first page length. Moreover, the method includes the step of formatting the document to utilize the second page size, the second line length, and the second page length.

Pursuant to another embodiment of the present invention, there is provided a method of converting a page size of a document from a first size having first dimensions to a second size having second dimensions while maintaining pagination of the document. One step of the method includes the step of determining a current margin value for a margin of the document. Another step of the method includes defining a margin conversion value based upon the first dimensions of the first size and the second dimensions of the second size. Yet another step of the method includes determining a new margin value from the current margin value and the margin conversion value. Moreover, the method includes the steps of setting the margin equal to the new margin value, and setting the page size of the document equal to the second size.

Pursuant to yet another embodiment of the present invention, there is provided a computer readable medium for converting a document from a first page size to a second page size. The computer readable media includes instructions that when executed by a processor cause the processor to determine a first line length from the document formatted for the first page size. The instructions when executed by the processor further cause the processor to determine a first page length from the document formatted for the first page size. The instructions when executed by the processor further cause the processor to define a second line length for the second page size that is equal to the first line length, and define a second page length for the second page size that is equal to the first page length. Moreover, the instructions when executed by the processor further cause the processor to format the document to utilize the second page size, the second line length, and the second page length.

It is an object of the present invention to provide a new document conversion process.

It is an object of the present invention to provide an improved document conversion process.

It is yet another object of the present invention to provide a document conversion process which preserves original document pagination.

It is still another object of the present invention to provide a document conversion process for converting a document between US Letter and A4 paper sizes without changing pagination of the document.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
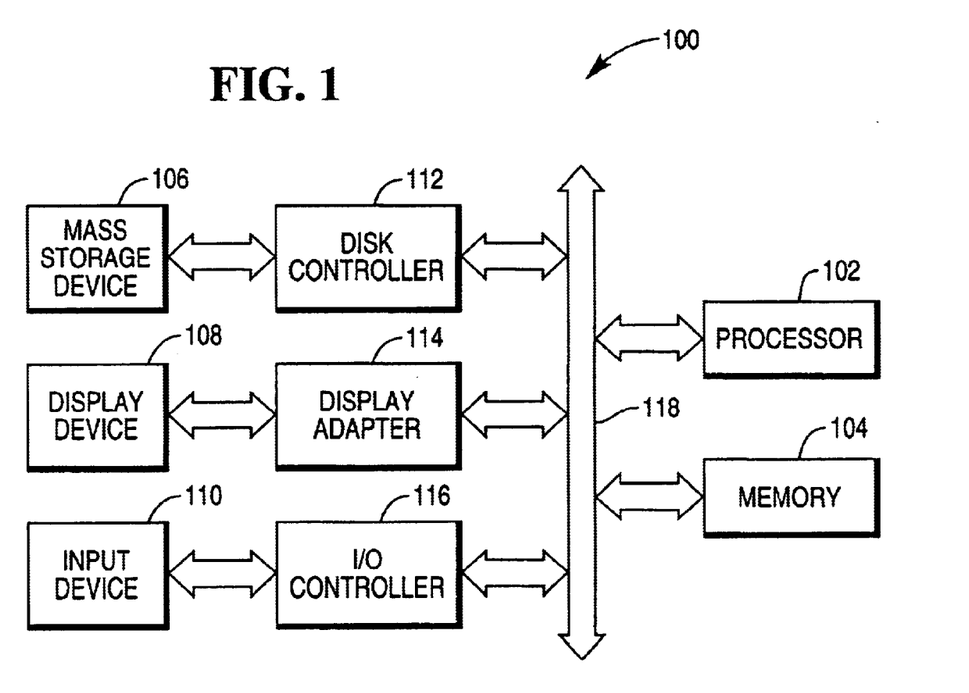
FIG. 1 shows a block diagram of a computer system in which features of the present invention may be incorporated.

FIG. 1 illustrates a computer system 100 in which various features of the present invention may be incorporated. In particular, the computer system 100 of FIG. 1 is suitable for implementing a document conversion utility in accordance with features of the present invention. To this end, the computer system 100 includes a processor 102, a memory 104, a mass storage device 106, a display device 108, and input devices 110. Moreover, the computer system 100 includes a disk controller 112 for controlling the mass storage device 106 (e.g. disk drives, CD-ROM drives, RAID device, DAT devices), a display adapter 114 for controlling the display device 108, an I/O controller 116 for controlling the input devices 110 (e.g. mice, keyboards, touch screens), and a system bus 118. The system bus 118 operably couples the processor 102 to the memory 104, the host adapter 112, the display adapter 114, and the I/O controller 116.

The memory 104 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, DAT (digital audio tape), and hard disks. The memory 104 may also include nonvolatile computer readable medium such as PROM (programmable read only memory), EPROM (electrically PROM), EEPROM (electrically erasable PROM), and flash memory that store software routines. In a preferred embodiment, the memory 104 is operable to store a word processing application such as Microsoft Word 7.0 that has been configured to convert documents of a first page size to a second page size while preserving pagination of the original document.

The processor 102 is operable to execute the software routines stored in the memory 104, and communicate with the mass storage device 106, the display device 108, and the input devices 110 via the disk controller 112, the display adapter 114, and the I/O controller 116 respectively. In particular, the processor 102 is operable to execute the word processing program stored in the memory 104 and instructions which cause the processor 102 to convert the page size of a document for a first page size to a second page size without altering the pagination of the original document.

Figure 2:
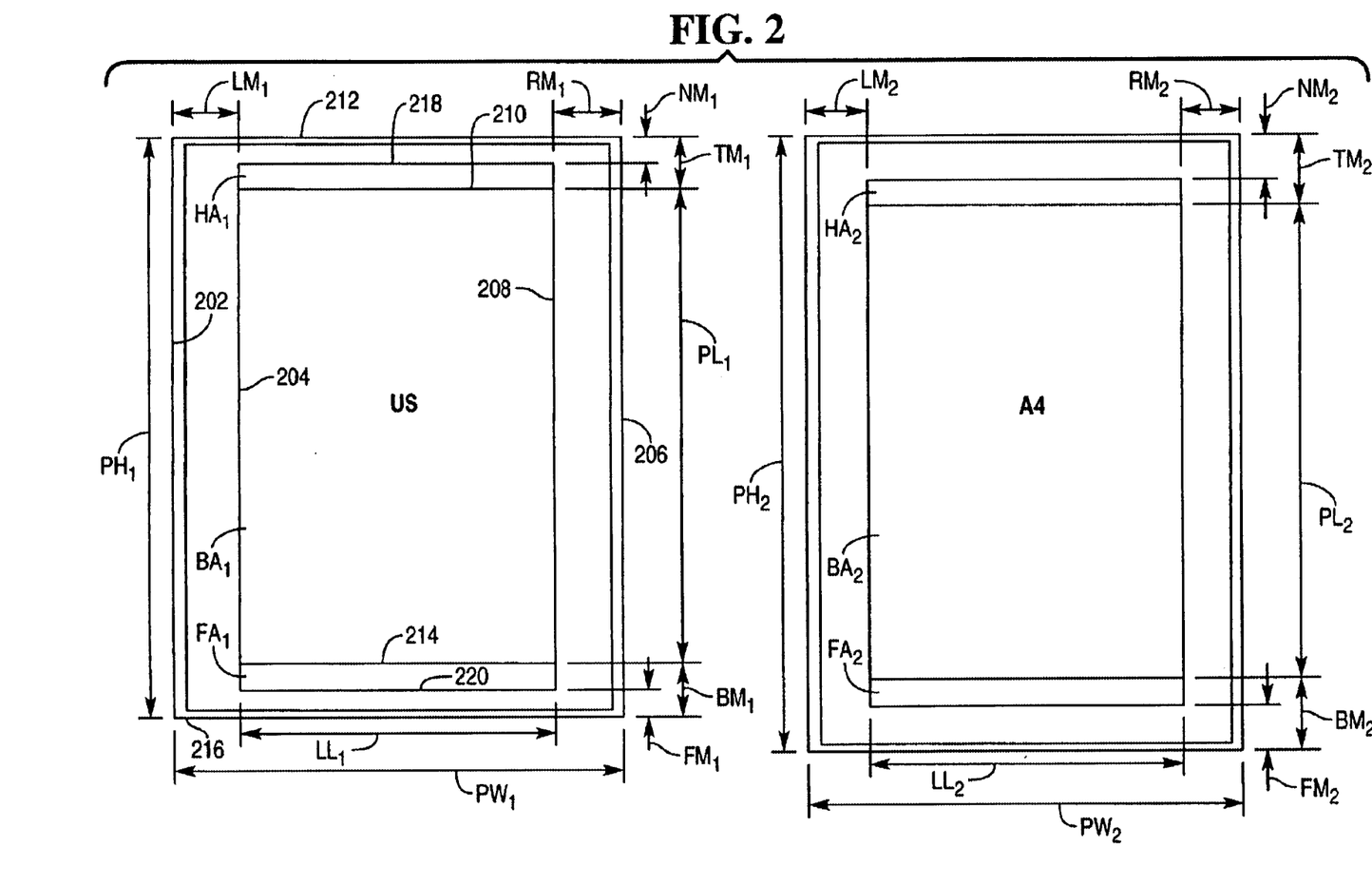
FIG. 2 illustrates characteristics of US Letter and A4 page sizes.

FIG. 2 illustrates page characteristics of two common page sizes. In particular, FIG. 2 illustrates page characteristics of a US Letter page size which is commonly used in the United States and an A4 page size which is commonly used in Europe. As illustrated, the US Letter page size has a page width of $PW_1$ of 8.5 inches and a page height $PH_1$ of 11 inches. The A4 page size, however, has a page width $PW_2$ of 8.27 inches and a page height $PH_2$ of 11.67 inches.

A document is typically formatted so that the contents of the document are printed both vertically and horizontally centered upon a page. In order to print the document both vertically and horizontally centered upon a page, a document body area in which to print the document is typically defined by setting a left margin, a right margin, a top margin, and a bottom margin for the document. For example, as illustrated in FIG. 2, a document body area $BA_1$ having a line length $LL_1$ and a page length $PL_1$ is defined for the US Letter page of FIG. 2 by a left margin $LM_1$, a right margin $RM_1$, a top margin $TM_1$, and a bottom $BM_1$ for the document. The line length $LL_1$ indicates maximum length for each line of text of the document, and the page length $PL_1$ indicates the maximum number of lines of text that may be printed in the document body area $BA_1$. Since the document may contain various graphics, fonts, layout information, and line spacing, the above analogy of the line length $LL_1$ and page length $PL_1$ are not exactly accurate. Accordingly, it is better to think of the line length $LL_1$ and page length $PL_1$ as indicating a document body width and document body height of the document body area $BA_1$.

The left margin $LM_1$ is used to define a left edge 204 of the document body area $BA_1$. In particular, the left margin LM, defines a horizontal displacement between the left edge 202 of the US Letter page and the left edge 204 of the document body area $BA_1$. Similarly, the right margin $RM_1$ is used to define a right edge 208 of the document body area $BA_1$. The right margin $RM_1$ defines a horizontal displacement between the right edge 206 of the US Letter page and the right edge 208 of the document body area $BA_1$. If the same value is used to define the left margin LM, and the right margin $RM_1$, then the resulting document body area $BA_1$ will be horizontally centered upon the page. A typical value for the left margin $LM_1$ and the right margin $RM_1$ is 1.25 inches.

The top margin $TM_1$ is used to define a top edge 210 of the document body area $BA_1$. In particular, the top margin $TM_1$ defines a vertical displacement between the top edge 212 of the US Letter page and the top edge 210 of the document body area $BA_1$. Similarly, the bottom margin $BM_1$ is used to define a bottom edge 214 of the document body area $BA_1$. The bottom margin $BM_1$ defines a horizontal displacement between the bottom edge 216 of the US Letter page and the bottom edge 214 of the document body area $BA_1$. If the same value is used to define the top margin $TM_1$ and the bottom margin $BM_1$, then the resulting document body area $BA_1$ will be vertically centered upon the page. A typical value for the top margin $TM_1$ and the bottom margin $BM_1$ is 1.0 inches.

Modern word processors such as Microsoft Word 7.0 also provide a header area and a footer area in which document information such as document title, author name, page number, chapter name, chapter title is typically placed. A header margin is typically used to define placement of the header area on the page. Similarly, a footer margin is typically used to define placement of the footer area on the page. For example, a header margin $HM_1$ is used to define a vertical displacement between the top edge 212 of the US Letter page and the top edge 218 of the header area $HA_1$. Similarly, a footer margin $FM_1$ is used to define a vertical displacement between the bottom edge 216 of the US Letter page and the bottom edge 220 of the footer area $FA_1$. Depending upon the header margin $HM_1$ and the contents of the header area $HA_1$, the header area $HA_1$ may shorten the document body length $PL_1$ by extending down into the document body area $BA_1$. Similarly, depending upon the footer margin $FM_1$ and the contents of the footer area $FA_1$, the footer area $FA_1$ may shorten the document body length $PL_1$ by extending up into the document body area $BA_1$. A typical value for the header margin $HM_1$ and the footer margin $FM_1$ is 0.5 inches.

Modern word processors also provide the user with a graphical user interface (GUI) which enables a user to easily define a paper size for the document. For example, a user may use the GUI of the word processor to change the page size of a document from US Letter to A4. In response to changing the page size, current word processors reformat the document for the document body area defined by the new page size. However, current word processors do not change the margins in response to the user changing the page size. As a result, current word processors reformat the document for a document body area that has a different document body width and a different document body length. This reformatting often results in a document having different pagination than the original document. Accordingly, any page references (e.g. table of contents, indices) may be incorrect for the newly formatted document.

In order to preserve pagination between page sizes, the computer system 100 of the present invention is programmed to alter the page size and margins of the document so that the document body area has the same document body width and document body length before and after the change in page size. As a result of maintaining the dimensions of the document body area, the resized document retains the pagination of the original document.

Figure 3:
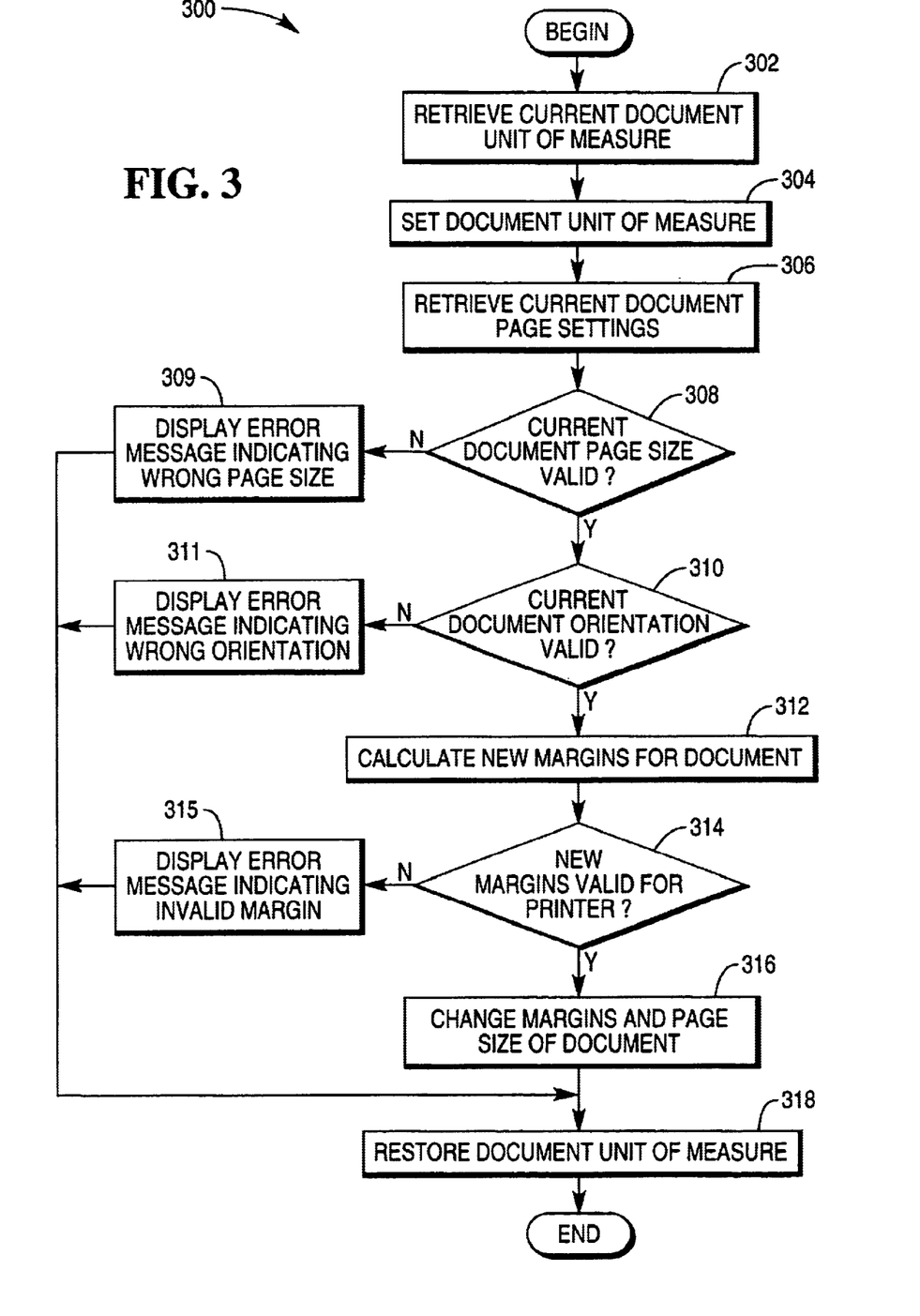
FIG. 3 illustrates a document conversion procedure implemented by the computer system of FIG. 1.

FIG. 3 illustrates a flowchart of a document conversion procedure 300 that incorporates features of the present invention therein. In a preferred embodiment of the present invention, the conversion procedure 300 is implemented as macro routines of a word processing application such as Microsoft Word 7.0. In particular, Word Basic code of a preferred implementation of the conversion procedure 300 for converting from US Letter to A4 is provided in Appendix A, and Word Basic code of a preferred implementation of the conversion procedure 300 for converting from A4 to US Letter is provided in Appendix B. In order to simplify the following discussion, the conversion procedure 300 will be described with reference to Appendix A. Accordingly, the conversion procedure 300 will be described in reference to converting a document formatted for US Letter paper to a document formatted for A4 paper.

In a preferred embodiment of the present invention, the processor 102 executes step 302 and the conversion procedure 300 in response to a request to execute a document conversion macro (see Appendix A) of a word processing application. The processor 102 in step 302 retrieves and stores the unit of measure (e.g. inches, centimeters, millimeters) currently used to represent distances in the document. (See lines 18–24 of Appendix A.) In step 304, the processor 102 sets the unit of measure for the document to a known unit such as inches. (See lines 25–28 of Appendix A.)

Then in step 306, the processor 102 obtains the current page setup information for the document. In particular, the processor 102 obtains a top margin value that defines the top margin $TM_1$ of the document in units of the known unit of measure set in step 304. Similarly, the processor 102 obtains a bottom margin value defining the bottom margin $BM_1$, a left margin value defining the left margin $LM_1$, a right margin value defining the right margin $RM_1$, a header margin value defining the header margin $HM_1$, a footer margin value defining the footer margin $FM_1$, and paper size value defining a paper size for the document. (See, lines 29–40 of Appendix A)

After obtaining the current page setup information for the document, the processor 102 in step 308 determines whether the current page size is valid for the conversion to be performed. (See lines 41–48 of Appendix A.) In a preferred embodiment of the present invention, a separate macro is defined for each document conversion to be performed by the processor 102. For example, in a preferred embodiment of the present invention, a macro for converting from US Letter to A4 is defined, and a macro for converting from A4 to US Letter is defined. Accordingly, the processor 102 in step 308 determines whether the current page size is appropriate for the macro being executed. More specifically, if the processor 102 is executing the US Letter to A4 macro, the processor 102 ensures that the current page size for the document is US Letter. It should be appreciated by those skilled in the art that a more generic conversion macro may be written that could process document conversions between various page sizes, thus eliminating the need for step 308 but presenting a need for many other validations to be performed.

If the processor 102 in step 308 determines that the current page size of the document is inappropriate, then the processor 102 proceeds to step 309. In step 309, the processor 102 causes a message box to be displayed which indicates that the document was not converted because the current page size was wrong. (See line 45 of Appendix A).

After causing the message box to be displayed in step 308, the processor 102 proceeds to step 318. (See line 46 and 102 of Appendix A.) In step 318, the processor restores the unit of measure obtained in step 302. (See line 104 of Appendix A.) In this manner, the document maintains the same unit of measure after conversion as the document had before conversion.

If the processor 102 in step 308 determines that the current page size of the document is appropriate for the current macro, then the processor 102 proceeds to step 310. In step 310, the processor 102 determines whether the current orientation of the document is valid. In particular, the processor 102 determines whether the document currently has a portrait orientation as opposed to a landscape orientation. The macro of Appendix A causes the processor 102 to only convert US Letter documents that have a portrait orientation. As a result, if the processor 102 determines in step 308, that the orientation of the document is not portrait, then the processor 102 proceeds to step 311. (See lines 49–54 of Appendix A.)

In step 311, the processor 102 causes a message box to be displayed which indicates that the document was not converted because the document does not have the proper orientation. (See line 52 of Appendix A). After causing the message box to be displayed in step 311, the processor 102 proceeds to step 318 in order to restore the unit of measure obtained in step 302. (See line 53 and 102 of Appendix A.)

If the processor 102 in step 310 determines that the current orientation of the document is valid for the macro, then the processor proceeds to step 312 in order to properly format the document for the new page size. In particular, the processor 102 in step 312 calculates new margins for the document which will cause the document to have the same document body width and document body height as the document had prior to changing the page size. In particular, the processor 102 adds a left margin conversion value to the left margin value obtained in step 306, and adds right margin conversion value to the right margin value obtained in step 306. The left margin conversion value and the right margin conversion value are calculated such that when added to the margin values of the original document, the resulting new left and right margins define a document body width for the new page size that is equal to the document body width defined for the original page size.

In particular, the left margin value and the right margin value are calculated by (i) determining a page width difference between the original page size and the new page size, and (ii) splitting the page width difference evenly between the left margin conversion value and the right margin conversion value. For example, the US Letter page size has a page width $PW_1$ of 8.5 inches and the A4 page size has a page width $PW_2$ of 8.27 inches. Accordingly, the page width difference between the US Letter page size and the A4 page size is −0.23 inches ($PW_2$−$PW_1$). Splitting the page width difference evenly between the left margin conversion value and the right margin conversion value results in a left margin conversion value of −0.115 inches (−0.23/2) and a right margin conversion value of −0.115 inches (−0.23/2). However, since the smallest increment of measure supported by Microsoft Word 7.0 is 0.01 inches, a preferred embodiment of the present invention uses −0.12 inches for the left margin conversion value and uses −0.11 inches for the right margin conversion value. (See lines 62–65 of Appendix A.)

In order to define a document page length for the resized document that is equal to the document page length for the original document, the processor 102 adds a top margin conversion value to the top margin value obtained in step 306, and adds a bottom margin conversion value to the bottom margin value obtained in step 306. The top margin conversion value and the bottom margin conversion value are calculated such that when added to the top margin value and bottom margin of the original document, the resulting new top margin and new bottom margin define a document body length $PL_2$ for the new page size that is equal to the document body length $PL_1$ defined for the original page size.

In particular, the top margin value and the bottom margin value are calculated by (i) determining a page height difference between the original page size and the new page size, and (ii) splitting the page height difference evenly between the top margin conversion value and the bottom margin conversion value. For example, the US Letter page size has a page height $PH_1$ of 11 inches and the A4 page size has a page height $PH_2$ of 11.69 inches. Accordingly, the page height difference between the US Letter page size and the A4 page size is +0.69 inches ($PH_2$−$PH_1$). Splitting the page height difference evenly between the top margin conversion value and the bottom margin conversion value results in a top margin conversion value of +0.345 inches (+0.69/2) and a right margin conversion value of +0.345 inches (+0.69/2). However, since the smallest increment of measure supported by Microsoft Word 7.0 is 0.01 inches, a preferred embodiment of the present invention uses +0.35 inches for the top margin conversion value and uses +0.34 inches for the bottom margin conversion value. (See lines 58–61 of Appendix A.)

In order to retain a document page length for the resized document that is equal to the document page length for the original document, the processor 102 also adds a header margin conversion value to the header margin value obtained in step 306, and adds footer margin conversion value to the footer margin value obtained in step 306. The header margin conversion value and the footer margin conversion value are calculated such that when added to the header margin value and footer margin value of the original document, the resulting new header margin and new footer margin have the same relation to the new document body length $PL_2$ defined by the new top margin and bottom margin as the header margin and footer margin had to the document body length $PL_1$ defined for the original page size. In particular, the processor 102 uses the top margin conversion value for the header conversion value. Similarly, the processor 102 uses the bottom margin conversion value for the footer margin conversion value. (See lines 66–70 of Appendix A.)

After obtaining the new margin values for the document, the processor 102 in step 314 determines whether the new margin values are valid. In particular, the processor 102 determines whether the new margin values define a document body area $BA_2$ that extends beyond the print capabilities of a printer (not shown) used to print the document. As depicted in FIG. 2 with shading, printers typically cannot print near the edge of the paper. Moreover, each printer model tends to have slightly different print capabilities. The macros shown in Appendix A and Appendix B were written for an Apple LaserWriter II NTX which is unable to print less than 0.22 inches from the left edge of the page, 0.21 inches from the right edge of the page, 0.11 inches from the top of the page, and 0.13 inches from the bottom of the page. (See lines 71–85 of Appendix A, and lines 73–100 of Appendix B).

If the processor 102 determines in step 314 that the new margin values are invalid, then processor 102 proceeds to step 315. (See lines 71–85 of Appendix A, and lines 73–100 of Appendix B). In step 315, the processor 102 causes a message box to be displayed which indicates that the document was not converted because a margin value of the document would be invalid if the document were converted. (See lines 75 and 81 of Appendix A). After causing the message box to be displayed in step 315, the processor 102 proceeds to step 318 in order to restore the unit of measure obtained in step 302. (See lines 77, 83 and 102 of Appendix A.)

If the processor 102 determines in step 314 that the new margin values are valid, then processor 102 proceeds to step 316. (See lines 71–85 of Appendix A, and lines 73–100 of Appendix B). In step 316, the processor 102 changes the margins and page size of the document. In particular, the processor 102 defines the left margin $LM_2$, the right margin $RM_2$, the top margin $TM_2$, the bottom margin $BM_2$, the header margin $HM_2$, the footer margin $FM_2$, and the page size for the document. (See lines 86–101 of Appendix A). After changing the margins and page size of the document, the processor 102 proceeds to step 318 in order to restore the unit of measure obtained in step 302. (See lines 77, 83 and 102 of Appendix A.)

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while a preferred embodiment of the present invention has been implemented with a Microsoft Word macro, features of the present invention may be implement in other word processors. Furthermore, features of the present invention may be implemented in a stand alone application such as a document conversion program. Moreover, while a preferred embodiment of the present invention has been implemented with certain hard coded values, the present invention may be implemented with more generic code that calculates the values at runtime.

Appendix A

The following source code changes the page size of a document from US Letter to A4 without changing the pagination of the document. In particular, the source code is written in Microsoft Word 7.0 Word Basic in order to implement a Microsoft Word 7.0 macro. Moreover, it should be appreciated that the line numbers presented to the left of each line of code are not part of the macro but are merely presented to ease code description.

```
Sub MAIN
'   Retrieve current Tools/General Option Settings
Dim TOGrec As ToolsOptionsGeneral
GetCurValues TOGrec
InitialUserUnitsSetting = TOGrec.Units
'   Set units of measure to inches
ToolsOptionsGeneral .Units = 0
'   Retrieve current page setup values
Dim FPSrec As FilePageSetup
GetCurValues FPSrec
TopMar$ = FPSrec.TopMargin
BottomMar$ = FPSrec.BottomMargin
LeftMar$ = FPSrec.LeftMargin
RightMar$ = FPSrec.RightMargin
HeaderMar$ = FPSrec.HeaderDistance
FooterMar$ = FPSrec.FooterDistance
PageSize$ = FPSrec.PaperSize
'   Check the current page size and orientation
'   If the page size is not USLetter then quit
If ( (PageSize$ <> "1") And (PageSize$ <> "0") ) Then
MsgBox "Current page size is NOT US Letter. This macro will end."
Goto Finish
End If
'   If the page orientation is not portrait then quit
If (FPSrec.Orientation <> 0) Then
MsgBox "Current page layout is not potrait. This macro will end."
Goto Finish
End If
'Calculate new margins
'TopMargin = current margin + .35"
TopMar = Val(TopMar$) + 0.35
'BottomMargin = current margin + .34"
BottomMar = Val(BottomMar$) + 0.34
'LeftMargin = current – .12"
LeftMar = Val(LeftMar$) – 0.12
'RightMargin = current – 0.11"
RightMar = Val(RightMar$) – 0.11
'Header = current + 35"
HeaderMar = Val(HeaderMar$) + 0.35
'Footer = current + 34"
FooterMar = Val(FooterMar$) + 0.34
'Check for left and right margins outside the print area. Print a
'message and exit without changing the document size to A4
If LeftMar < 0.23 Then
MsgBox "The left margin is less than .23 inches. This document will
not be converted to A4 size."
Goto Finish
End If
If RightMar < 0.22 Then
MsgBox "The right margin is less than .22 inches. This document
will not be converted to A4 size."
Goto Finish
End If
'Set new margins
FPSrec.TopMargin = Str$(TopMar) + Chr$(34)
FPSrec.BottomMargin = Str$(BottomMar) + Chr$(34)
FPSrec.LeftMargin = Str$(LeftMar) + Chr$(34)
FPSrec.RightMargin = Str$(RightMar) + Chr$(34)
FPSrec.HeaderDistance = Str$(HeaderMar) + Chr$(34)
FPSrec.FooterDistance = Str$(FooterMar) + Chr$(34)
FPSrec.PaperSize = "9"
FPSrec.PageWidth = "8.27" + Chr$(34)
FPSrec.PageHeight = "11.69" + Chr$(34)
'   Update the values of the FilePageSetup dialog
FilePageSetup FPSrec
Finish:
If InitialUserUnitsSetting <> 0 Then ToolsOptionsGeneral .Units =
InitialUserUnitsSetting
End Sub
```

Appendix B

The following source code changes the page size of a document from A4 to US Letter without changing the pagination of the document. In particular, the source code is written in Microsoft Word 7.0 Word Basic in order to implement a Microsoft Word 7.0 macro. Moreover, it should be appreciated that the line numbers presented to the left of each line of code are not part of the macro but are merely presented to ease code description.

```
Sub MAIN
'   Retrieve current Tools/General Option Settings
Dim TOGrec As ToolsOptionsGeneral
GetCurValues TOGrec
InitialUserUnitsSetting = TOGrec.Units
'   Set units of measure to inches
ToolsOptionsGeneral .Units = 0
'   Retrieve current page setup values
Dim FPSrec As FilePageSetup
GetCurValues FPSrec
TopMar$ = FPSrec.TopMargin
BottomMar$ = FPSrec.BottomMargin
LeftMar$ = FPSrec.LeftMargin
RightMar$ = FPSrec.RightMargin
HeaderMar$ = FPSrec.HeaderDistance
FooterMar$ = FPSrec.FooterDistance
PageSize$ = FPSrec.PaperSize
'   Check the current page size and orientation
'   If page size is not A4 then quit
If (PageSize$ <> "9") Then
MSgBox "Current page size is NOT A4 size. This macro will end."
Goto Finish
End If
'   If page orientation is not portrait then quit
If (FPSrec.Orientation <> 0) Then
MsgBox "Current page layout is not portrait. This macro will end."
Goto Finish
End If
'   Calculate new margins
'TopMargin = current margin – .35"
TopMar = Val(TopMar$) – 0.35
'BottomMargin = current margin – .34"
BottomMar = Val(BottomMar$) – 0.34
'LeftMargin = current + .12"
LeftMar = Val(LeftMar$) + 0.12
'RightMargin = current + 0.11"
RightMar = Val(RightMar$) + 0.11
'Header = current – 35"
HeaderMar = Val(HeaderMar$) – 0.35
'Footer = current – 34"
FooterMar = Val(FooterMar$) – 0.34
'Check for top, bottom, header and footer margins outside the print
'area. Print a'message and exit without changing the document
size to 'A4
If TopMar < 0.12 Then
MsgBox "The top margin is less than .12 inches. This document
will not be converted to US Letter size."
Goto Finish
End If
If BottomMar < 0.12 Then
MsgBox "The bottom margin is less than .12 inches. This document
will not be converted to US Letter size."
Goto Finish
End If
If HeaderMar < 0.12 Then
MsgBox "The header is less than .12 inches from the edge. This
document will not be converted to US Letter size."
Goto Finish
Enf If
If FooterMar < 0.12 Then
MsgBox "The footer is less than .12 inches from the edge. This
document will not be converted to US Letter size."
Goto Finish
End If
'   Set new margins
FPSrec.TopMargin = Str$ (TopMar) + Chr$ (34)
FPSrec.BottomMargin = Str$ (BottomMar) + Chr$ (34)
FPSrec.LeftMargin = Str$ (LeftMar) + Chr$ (34)
FPSrec.RightMargin = Str$ (RightMar) + Chr$ (34)
FPSrec.HeaderDistance = Str$ (HeaderMar) + Chr$ (34)
FPSrec.FooterDistance = Str$ (FooterMar) + Chr$ (34)
FPSrec.PaperSize = "0"
FPSrec.PageWidth = "8.5" + Chr$ (34)
FPSrec.PageHeight = "11" + Chr$ (34)
'   Update the values of the FilePageSetup dialog
FilePageSetup FPSrec
```

```
Finish:
    If InitialUserUnitsSetting <> 0 Then ToolsOptionsGeneral .Units =
    InitialUserUnitsSetting
    End Sub
```

What is claimed is:

1. A computer executable method of converting a word processing document from a first page size to a second page size while maintaining pagination of the word processing document, comprising the steps of:

opening a document conversion application associated with a word processing application upon receipt of a user request to convert a word processing document from a first page size to a second page size;

determining a first line length from said word processing document formatted for said first page size;

determining a first page length from said word processing document formatted for said first page size;

defining a second line length for said second page size that is equal to said first line length;

defining a second page length for said second page size that is equal to said first page length; and formatting said word processing document to utilize said second page size, said second line length, and said second page length, wherein pagination of said word processing document is maintained.

2. The computer executable method of claim 1, wherein:

said first line length determining step comprises the step of determining said first line length from a first left margin value and a first right margin value for said word processing document formatted for said first page size; and said second line length defining step comprises the step of defining a second left margin value and a second right margin value for said second page size based upon said first left margin value and said first right margin value.

3. The computer executable method of claim 1, wherein:

said first page length determining step comprises the step of determining said first page length from a first top margin value and a first bottom margin value for said word processing document formatted for said first page size; and said second page length defining step comprises the step of defining a second top margin value and a second bottom margin value for said second page size based upon said first top margin value and said first bottom margin value.

4. The computer executable method of claim 1, wherein:

said first line length determining step comprises the step of determining said first line length from a first left margin value and a first right margin value for said word processing document formatted for said first page size;

said second line length defining step comprises the step of defining a second left margin value and a second right margin value for said second page size based upon said first left margin value and said first right margin value;

said first page length determining step comprises the step of determining said first page length from a first top margin value and a first bottom margin value for said word processing document formatted for said first page size; and said second page length defining step comprises the step of defining a second top margin value and a second bottom margin value for said second page size based upon said first top margin value and said first bottom margin value.

5. The computer executable method of claim 1, further comprising the steps of:

determining before said formatting step that said second line length does not extend beyond a print area capability of a printer to which said word processing document is to be printed; and determining before said formatting step that said second page length does not extend beyond said print area capability of said printer.

6. The computer executable method of claim 1, further comprising the steps of:

defining a left margin conversion value based upon a page width difference between said first page size and said second page size;

defining a right margin conversion value based upon said page width difference between said first page size and said second page size, wherein:

said first line length determining step comprises the step of determining a first left margin value and a first right margin value for said word processing document formatted for said first page size; and said second line length defining step comprises the steps of (i) defining a second left margin value for said second page size based upon said first left margin value and said left margin conversion value, and (ii) defining a second right margin value for said second page size based upon said first right margin value and said first right margin conversion value.

7. The computer executable method of claim 6, further comprising the steps of:

defining a top margin conversion value based upon a page length difference between said first page size and said second page size;

defining a bottom margin conversion value based upon said page length difference between said first page size and said second page size, wherein:

said first page length determining step comprises the step of determining a first top margin value and a first bottom margin value for said word processing document formatted for said first page size; and said second page length defining step comprises the steps of (i) defining a second top margin value for said second page size based upon said first top margin value and said top margin conversion value, and (ii) defining a second bottom margin value for said second page size based upon said first bottom margin value and said first bottom margin conversion value.

8. A computer executable method of converting a page size of a word processing document from a first size having first dimensions to a second size having second dimensions while maintaining pagination of said word processing document, comprising the steps of:

opening a document conversion application associated with a word processing application upon receipt of a user request to convert a word processing document from a first size having first dimensions to a second size having second dimensions;

determining a current margin value for a margin of said word processing document;

defining a margin conversion value based upon said first dimensions of said first size and said second dimensions of said second size;

determining a new margin value from said current margin value and said margin conversion value;

setting said margin equal to said new margin value; and setting said page size of said word processing document equal to said second size, while maintaining pagination of said word processing document.

9. The computer executable method of claim 8, further comprising the step of:

prior to said margin setting step and said page size setting step, determining that said new margin value would not extend said document beyond a print area capability of a printer to which said document is to be printed.

10. The computer executable method of claim 8, wherein:

said current margin value corresponds to a left margin value for said document, and said defining step comprises the step of defining said margin conversion value based upon a page width difference between said first size and said second size.

11. The computer executable method of claim 10, further comprising the step of:

determining a current right margin value for said word processing document;

defining a right margin conversion value based upon based upon said page width difference between said first size and said second size;

determining a new right margin value from said current right margin value and said right margin conversion value; and setting said right margin equal to said new right margin value.

12. The computer executable method of claim 11, wherein:

said current margin value determining step and said current right margin determining step obtain a current line length for said document, and said new margin value defining step and said new right margin defining step define a new line length for said document that is equal to said current line length.

13. The computer executable method of claim 8, wherein:

said current margin value corresponds to a top margin value for said word processing document, and said defining step comprises the step of defining said margin conversion value based upon a page length difference between said first size and said second size.

14. The computer executable method of claim 13, further comprising the step of:

determining a current bottom margin value for said word processing document;

defining a bottom margin conversion value based upon based upon said page length difference between said first size and said second size;

determining a new bottom margin value from said current bottom margin value and said bottom margin conversion value; and setting said bottom margin equal to said new bottom margin value.

15. The computer executable method of claim 14, wherein:

said current margin value determining step and said current bottom margin determining step obtain a current page length for said word processing document, and said new margin value defining step and said new right margin defining step define a new page length for said word processing document that is equal to said current page length.

16. A computer readable medium for execution by a computer for converting a word processing document from a first page size to a second page size while maintaining pagination of said word processing document, comprising a plurality of instructions that when executed by a processor of the computer cause said processor to:

open a document conversion application associated with a word processing application upon receipt of a user request to convert a word processing document from a first page size to a second page size;

determine a first line length from said word processing document formatted for said first page size;

determine a first page length from said word processing document formatted for said first page size;

define a second line length for said second page size that is equal to said first line length;

define a second page length for said second page size that is equal to said first page length; and format said word processing document to utilize said second page size, said second line length, and said second page length, while maintaining pagination of said word processing document.

17. The computer readable medium for execution by a computer of claim 16, wherein said plurality of instructions when executed by said processor further cause said processor to:

determine said first line length from a first left margin value and a first right margin value for said word processing document formatted for said first page size; and define a second left margin value and a second right margin value for said second page size based upon said first left margin value and said first right margin value.

18. The computer readable medium for execution by a computer of claim 16, wherein said plurality of instructions when executed by said processor further cause said processor to:

determine said first page length from a first top margin value and a first bottom margin value for said word processing document formatted for said first page size;

define a second top margin value for said second page size based upon said first top margin value; and define a second bottom margin value for said second page size based upon said first bottom margin value.

19. The computer readable medium for execution by a computer of claim 16, wherein said plurality of instructions when executed by said processor further cause said processor to:

determine a first left margin value and a first right margin value for said word processing document formatted for said first page size;

define a second left margin value for said second page size based upon said first left margin value;

define a second right margin value for said second page size based upon said first right margin value;

determine a first top margin value and a first bottom margin value for said word processing document formatted for said first page size;

define a second top margin value for said second page size based upon said first top margin value; and define a second bottom margin value for said second page size based upon said first bottom margin value.

20. The computer readable medium for execution by a computer of claim 16, wherein said plurality of instructions when executed by said processor further cause said processor to:

determine a first left margin value, a first right margin value, a first top margin value, and a first bottom margin value for said word processing document formatted for said first page size;

define a left margin conversion value based upon a page width difference between said first page size and said second page size;

define a right margin conversion value based upon said page width difference between said first page size and said second page size;

define a top margin conversion value based upon a page length difference between said first page size and said second page size;

define a bottom margin conversion value based upon said page length difference between said first page size and said second page size, wherein:

define a second left margin value for said second page size based upon said first left margin value and said left margin conversion value;

define a second right margin value for said second page size based upon said first right margin value and said first right margin conversion value;

define a second top margin value for said second page size based upon said first top margin value and said top margin conversion value;

define a second bottom margin value for said second page size based upon said first bottom margin value and said first bottom margin conversion value; and format said word processing document to utilize said second left margin value, said second right margin value, said second top margin value, and said second bottom margin value.

* * * * *